United States Patent
Xu et al.

(10) Patent No.: US 8,444,279 B2
(45) Date of Patent: May 21, 2013

(54) SECURITY FILM AND PROCESS FOR PREPARATION THEREOF

(75) Inventors: Liangheng Xu, Shanghai (CN); Kai Yang, Shanghai (CN); Aiming Ge, Shanghai (CN)

(73) Assignee: Shanghai Techsun Anti-Counterfeiting Technology Holding Co., Ltd., Shanghai (CN)

( * ) Notice: Subject to any disclaimer, the term of this patent is extended or adjusted under 35 U.S.C. 154(b) by 294 days.

(21) Appl. No.: 13/001,979

(22) PCT Filed: Jul. 29, 2008

(86) PCT No.: PCT/CN2008/071789
§ 371 (c)(1),
(2), (4) Date: Mar. 15, 2011

(87) PCT Pub. No.: WO2010/000113
PCT Pub. Date: Jan. 7, 2010

(65) Prior Publication Data
US 2011/0175345 A1    Jul. 21, 2011

(30) Foreign Application Priority Data
Jun. 30, 2008   (CN) .......................... 2008 1 0039808

(51) Int. Cl.
*G02B 5/128*   (2006.01)

(52) U.S. Cl.
USPC .............................. 359/539; 359/540; 283/85

(58) Field of Classification Search
USPC ............. 359/534–542; 283/85, 107, 109–112
See application file for complete search history.

(56) References Cited

U.S. PATENT DOCUMENTS
5,882,771 A *   3/1999   Klein et al. ................... 428/161

FOREIGN PATENT DOCUMENTS
CN            1737881 A      2/2006

* cited by examiner

*Primary Examiner* — James Phan
(74) *Attorney, Agent, or Firm* — K&L Gates LLP

(57) ABSTRACT

Disclosed herein are an anti-counterfeiting film and a process for preparation thereof. The anti-counterfeiting film comprises a protective layer (1), a binder layer (2), a retroreflective layer (3), a photopolymerizable information layer (4) and a reflective layer (5) which are combined in turn. The retroreflective layer (3) is embedded spherically in the binder layer (2), and the photopolymerizable information layer (4) has been recorded with graphics information which can change along with the viewing angle.

8 Claims, 1 Drawing Sheet

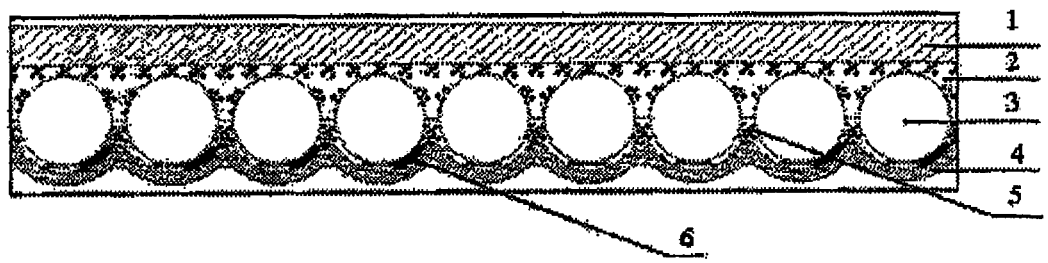
Fig. 1
 
Fig. 2    Fig. 3
  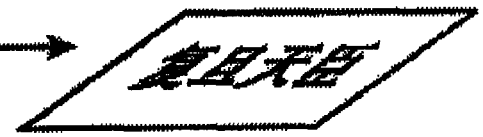
a    b
Fig. 4
 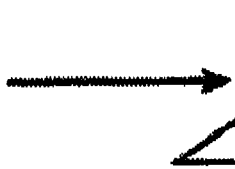 
c    d
Fig. 5

_US 8,444,279 B2_

SECURITY FILM AND PROCESS FOR PREPARATION THEREOF

TECHNICAL FIELD

The present invention relates to an anti-counterfeiting film having visible graphics information which can change along with the visual angle to change the effect, and a process for preparation thereof.

BACKGROUND ART

Since the eighties and nineties of twentieth century, forgery and counterfeiting crime have become another global public hazard besides traffic in drugs, smuggling and environmental pollution day by day. According to statistics of authorities, the total output value of economy generated by forgery and counterfeiting activities reaches $250 billion every year in the world. The products of famous business enterprises are favoured by counterfeiters. Even more, the counterfeiting crime activities penetrate into special fields (e.g. money, securities, ID card and etc.) such as national economy and politics security, which causes great harm to society. Thereby, all governments of various countries take fighting against the counterfeiting crime activities as a long-term hard work.

Currently, the widely used anti-counterfeiting products are divided into two classes: one includes laser holography, visual angle color, watermark, various printing anti-counterfeit and etc., which can be identified by naked eyes or simple methods. This class of anti-counterfeiting technology is liable to be accepted by consumers and is easier to be popularized. It is a popularized anti-counterfeiting technology by which the consumers can identify the real and the fake by themselves. This class of anti-counterfeiting technology has a biggest advantage: in-place rapidity and immediacy. However, this class of anti-counterfeiting technology has been widely used at present and the technological barrier for coping it is low, therefore, it is easier to be copied. Thus, it is short of anti-counterfeiting capability grade and anti-counterfeiting performance. Another class includes ultraviolet fluorescence, infrared fluorescence, telephone code, barcode, two-dimensional code and etc., which can be identified by means of tools and thereby has a higher technological barrier for copying and better anti-counterfeiting performance than the first class of anti-counterfeiting technology. This class of anti-counterfeiting technology is identified by means of special tools and more depends on other factors than skills of the consumers, for example, manufactures, experts, technique supervising department and alike.

SUMMARY OF THE INVENTION

The object of the present invention is to provide an anti-counterfeiting film and a process for preparation thereof to overcome the above defects existing in the prior art.

The anti-counterfeiting film of the present invention comprises a protective layer, a binder layer, a retroreflective layer, a photopolymerizable information layer and a reflective layer which are combined in turn. The retroreflective layer is embedded spherically in the binder layer, and the photopolymerizable information layer has been recorded with graphics information which can change along with the viewing angle.

The material of the protective layer 1 is transparent macromolecular polyester, process for preparation thereof.

BACKGROUND ART

Since the eighties and nineties of twentieth century, forgery and counterfeiting crime have become another global public hazard besides traffic in drugs, smuggling and environmental pollution day by day. According to statistics of authorities, the total output The retroreflective layer is an optical material having high refractive index, preferably glass or PC (polycarbonate) and etc.;

The material of the photopolymerizable information layer comprises components having the following weight percentages:

photopolymerization monomer: 20%-60%
photoinitiator: 1%-10%
binder: 30%-79% with the sum of the percentages of the above respective component being 100%.

Preferably, the material of the photopolymerizable information layer comprises components having the following weight percentages:

photopolymerization monomer: 25%-50%
photoinitiator: 2%-8%
binder: 42%-73%

The photopolymerization monomer is one or more selected from the group consisting of EM210 (2-phenoxyethyl acrylate), EM2211 (ethoxylated 1,6-hexanediol diacrylate), EM224 (polyethylene. glycol (200) diacrylate), APG-400 (alkyl polyglucoside) and BPE-500 (ethoxylated bisphenol A dimethacrylate).

The binder is one or more selected from the group consisting of acrylic acid, methacrylic acid, methyl methacrylate and 2-ethylhexyl acrylate;

The photoinitiator is one or more selected from the group consisting of benzophenone, diethylamino benzophenone, leuco crystal violet and toluenesulfonic acid monohydrate;

The reflective layer is the material having high reflectance, preferably Al (aluminum), Ag (argentum) or Cr (chromium);

The process for preparation of the anti-counterfeiting film comprises the following steps:

(1) coating the binder layer material over the protective layer; embedding the retroreflective layer material into the binder layer and drying at 100° C.-130° C. for 2-3 minutes; coating the photopolymerizable information layer over the retroreflective layer and drying at 100° C.-150° C. for 3-5 minutes to obtain a retroreflective film;

(2) placing the upper surface of the protective layer 1 of the above retroreflective film beneath an exposure template configured with template graphics; subjecting the retroreflective film to first exposure treatment via the linear polarized ultraviolet, an exposure time being 0.1-0.9 seconds, an exposure energy being 30-50 mJ/cm$^2$, an exposure angle being 60-90°;

By radiation with ultraviolet light, photopolymerization monomer molecule is subjected to polymerization reaction along the polarization direction of the ultraviolet light. By virtue of special optical structure of directional retroreflective film, the photopolymerization monomer is subjected to polymerization reaction only along the direction consistent with the polarization direction of the ultraviolet light so as to change the optical property thereof and form the graphics information consistent with the exposure template;

Changing the graphics of the exposure template and the exposure angle, subjecting the retroreflective film to second exposure treatment via linear polarized ultraviolet light, the exposure time being 0.1-0.9 seconds, the exposure energy being 30-50 mJ/cm$^2$, the exposure angle being 15-60°; so as to form different graphics information at another angle; then high-vacuum vapor-depositing a reflective layer material on the photopolymerizable information layer to obtain the anti-counterfeiting film of the present invention;

The term "exposure angle" means the angle between the exposure light source and the anti-counterfeiting film;

Preferably, angle difference between the first exposure treatment and the second exposure treatment is 30-50°;

Further, during the preparation process of the above anti-counterfeiting film, the exposure template is lighttight polyester material, metal material or lighttight glass and etc.;

The exposure template may also be various transmissive displays such as TN-LCD (twisted nematic liquid crystal display), ECB-LCD (electrically controlled birefringence liquid crystal display), PC-LCD (phase change liquid crystal display), STN-LCD (super twisted nematic liquid crystal display) or TFT-LCD (thin film transistor liquid crystal display) and etc.; by changing the display information Thereon, different types of graphics information such as randomly changed number can be prepared on the above retroreflective film; said randomly changed number has been widely used for logistics management and anti-counterfeiting of information.

The anti-counterfeiting film of the present invention has an effect that visible graphics information can change along with the visual angle. The effect that the visible graphics information can change along with the visual angle of the present invention means that graphics A can be seen when viewing at a special angle a, after transforming the viewing angle into b, the graphics A disappears or graphics B can be seen, transformation of multiple graphics information between multiple angles can be achieved according to different techniques.

The anti-counterfeiting film of the present invention has special anti-counterfeiting effect and thus is liable to be identified, its special visual effect prominently differs from anti-counterfeiting technologies such as laser holography, visual angle color and precision printing; furthermore, such technique can be identified by naked eyes without any tools and is liable to be identified by consumers. The present invention introduces the directional retroreflective technique into the anti-counterfeiting field to impart special anti-counterfeiting characteristics to it so as to improve technological barriers and enlarge anti-counterfeiting capability grade.

DESCRIPTION OF DRAWINGS

FIG. 1 is the structure profile of the anti-counterfeiting film.

FIG. 2 is the exposure template of the first exposure of Example 1.

FIG. 3 is the exposure template of the second exposure of Example 1.

FIG. 4 is a graph of the effect of product of Example 1.

FIG. 5 is a graph of the effect of product of Example 2.

DETAILED DESCRIPTIONS OF THE PREFERRED EMBODIMENTS

See FIG. 1, the anti-counterfeiting film of the present invention comprises a protective layer 1, a binder layer 2, a retroreflective layer 3, a photopolymerizable information layer 4 and a reflective layer 5 which are combined in turn. The retroreflective layer 3 is embedded spherically in the binder layer 2, the spherical diameter is from 10 μm to 100 μm. The photopolymerizable information layer 4 has been recorded with graphics information 6 which can change along with the viewing angle.

Preferably, the thickness of the protective layer 1 is from 25 μm to 50 μm, the thickness of the binder layer 2 is from 50 μm to 70 μm, the thickness of the photopolymerizable information layer 4 is from 15 μm to 30 μm, and the thickness of the reflective layer 5 is from 60 nm to 200 nm.

In the following Examples, if without a special note, the composition of components is in weight percentage.

EXAMPLE 1

A PET (polyethylene terephthalate) film was taken as a material of the protective layer 1, a polyurethane binder layer 2 material was coated over the PET film, a spherical glass material having a diameter of 70 μm and a refractive index of 2.2 was embedded therein to form a retroreflective layer 3, the resultant product was dried at 120° C. for 2 minutes, then a photopolymerizable information layer 4 material was coated over the retroreflective layer 3, wherein the composition components of the photopolymerizable information layer 4 material were as follows:

photopolymerization monomer: EM210 25%
photoinitiator: benzophenone 2%
binder methyl methacrylate 45% methacrylic acid 28%

The resultant product was dried at 140° C. for 3 minutes to form a retroreflective film;

The protective layer surface of the above retroreflective film was placed beneath a metal exposure template made of stainless steel material as shown in FIG. 2, so as to subject the retroreflective film to first exposure treatment via linear polarized ultraviolet light. The exposure time was 0.3 seconds, the exposure energy was 50 mJ/cm$^2$ and the exposure angle was 90°;

An exposure template graphics and exposure angle as shown in FIG. 3 were further adopted to subject the retroreflective film to second exposure treatment via linear polarized ultraviolet light. The exposure time was 0.3 seconds, the exposure energy was 50 mJ/cm$^2$ and the exposure angle was 45°. As a result, different graphics information at another angle was formed;

A reflective layer 5 material Al was High-vacuum vapor-deposited on the photopolymerizable information layer to form an anti-counterfeiting film having visible graphics information which could change along with the visual angle, as shown in FIG. 4. Figure a was a graph of direct viewing and figure b was a graph when transforming the viewing angle.

The thickness of the protective layer 1 was 38 μm, the thickness of the binder layer 2 was 50 μm, the thickness of the photopolymerizable information layer 4 was 20 μm, the thickness of the reflective layer 5 was 100 nm and the spherical diameter of the retroreflective layer 3 was 70 μm.

EXAMPLE 2

A PET (polyethylene terephthalate) film was taken as a material of the protective layer, a polyurethane binder layer material was coated over the PET film, a spherical glass material having a diameter of 50 μm and a refractive index of 2.2 was embedded therein to form a retroreflective layer, the resultant product was dried at 110° C. for 3 minutes, then a photopolymerizable information layer material was coated over the retroreflective layer, wherein the composition components of the photopolymerizable information layer material were as follows:

photopolymerization monomer: EM210 15% EM224 10%
photoinitiator: diethylamino benzophenone 5%
binder methyl methacrylate 25%
2-ethylhexyl acrylate 45%

The resultant product was dried at 140° C. for 3 minutes to form a retroreflective film;

The protective layer surface of the above retroreflective film was placed beneath a exposure template of TFT-LCD (low-temperature polycrystalline silicon liquid crystal display, a product having a brand LQ035Q3DH01 by SHARP Corp.), so as to subject the retroreflective film to first exposure treatment via linear polarized ultraviolet light. The exposure time was 0.6 seconds, the exposure energy was 50 mJ/cm$^2$ and the exposure angle was 80°;

The display graphics of LCD exposure template was changed to random number and the exposure angle was changed, then a second exposure treatment was carried out. The exposure time was 0.6 seconds, the exposure energy was 50 mJ/cm$^2$ and the exposure angle was 30°. As a result, different graphics information at another angle was formed;

A reflective layer material Al was high-vacuum vapor-deposited on the photopolymerizable information layer to form an anti-counterfeiting film having visible graphics information which could change along with the visual angle, as shown in FIG. 5.

The thickness of the protective layer 1 was 36 μm, the thickness of the binder layer 2 was 40 μm, the thickness of the photopolymerizable information layer 4 was 25 μm, the thickness of the reflective layer 5 was 100 nm and the spherical diameter of the retroreflective layer 3 was 50 μm. Figure c and figure d were separately the image of different viewing angles.

EXAMPLE 3

A PET (polyethylene terephthalate) film was taken as a material of the protective layer, a polyurethane binder layer material was coated over the PET film, a spherical glass material having a diameter of 50 μm and a refractive index of 2.2 was embedded therein to form a retroreflective layer, the resultant product was dried at 120° C. for 3 minutes, then a photopolymerizable information layer material was coated over the retroreflective layer, wherein the composition components of the photopolymerizable information layer material were as follows:

photopolymerization monomer BPE-500 15% EM2211 25% photoinitiator: diethylamino benzophenone 5% benzophenone 2% binder: methyl methacrylate 15% methacrylic acid 33% acrylic acid 5%

The resultant product was dried at 150° C. for 3 minutes to form a retroreflective film;

The protective layer surface of the above retroreflective film was placed beneath a metal exposure template made of stainless steel material, so as to subject the retroreflective film to first exposure treatment via linear polarized ultraviolet light. The exposure time was 0.4 seconds, the exposure energy was 40 mJ/cm$^2$ and the exposure angle was 90°;

The exposure template graphics and the exposure angles were changed, then a second exposure treatment was carried out. The exposure time was 0.4 seconds, the exposure energy was 40 mJ/cm$^2$ and the exposure angle was 40°. As a result, different graphics information at another angle was formed;

Finally, a reflective layer 5 material Al was high vacuum vapor-deposited on the photopolymerizable information layer to form an anti-counterfeiting film having visible graphics information which could change along with the visual angle.

The thickness of the protective layer 1 was 50 μm, the thickness of the binder layer 2 was 40 μm, the thickness of the photopolymerizable information layer 4 was 25 μm, the thickness of the reflective layer 5 was 150 nm and the spherical diameter of the retroreflective layer 3 was 50 μm.

EXAMPLE 4

A PET (polyethylene terephthalate) film was taken as a material of the protective layer, a polyurethane binder layer material was coated over the PET film, a spherical glass material having a diameter of 70 μm and a refractive index of 2.2 was embedded therein to form a retroreflective layer, the resultant product was dried at 120° C. for 3 minutes, then a photopolymerizable information layer material was coated over the retroreflective layer, wherein the composition components of the photopolymerizable information layer material were as follows:

photopolymerization monomer: BPE-500 25% EM224 15% EM2211 10% photoinitiator: benzophenone 3% toluenesulfonic acid monohydrate 5% binder: methyl methacrylate 15% methacrylic acid 17% 2-ethylhexyl acrylate 10%

The resultant product was dried at 130° C. for 5 minutes to form a retroreflective film;

The protective layer surface of the above retroreflective film was placed beneath a metal exposure template made of stainless steel material, so as to subject the retroreflective film to first exposure treatment via linear polarized ultraviolet light. The exposure time was 0.6 seconds, the exposure energy was 50 mJ/cm$^2$ and the exposure angle was 90°;

The exposure template graphics and the exposure angle were changed, then a second exposure treatment was carried out. The exposure time was 0.6 seconds, the exposure energy was 50 mJ/cm$^2$ and the exposure angle was 40°;

Finally, a reflective layer material Al was high-vacuum vapor-deposited on the photopolymerizable information layer to form an anti-counterfeiting film having visible graphics information which could change along with the visual angle.

The thickness of the protective layer 1 was 25 μm, the thickness of the binder layer 2 was 70 μm, the thickness of the photopolymerizable information layer 4 was 30 μm, the thickness of the reflective layer 5 was 120 nm and the spherical diameter of the retroreflective layer 3 was 70 μm.

EXAMPLE 5

A PET (polyethylene terephthalate) film was taken as a material of the protective layer, a polyurethane binder layer material was coated over the PET film, a spherical PC (polycarbonate) material having a diameter of 60 μm and a refractive index of 2.2 was embedded therein to form a retroreflective layer, the resultant product was dried at 120° C. for 3 minutes, then a photopolymerizable information layer material was coated over the retroreflective layer, wherein the composition components of the photopolymerizable information layer material were as follows:

photopolymerization monomer: EM224 15% APG-400 (alkyl polyglucoside) 15% photoinitiator: benzophenone 3% leuco crystal violet 5% binder: methyl methacrylate 25% acrylic acid 22% 2-ethylhexyl acrylate 15%

The resultant product was dried at 140° C. for 4 minutes to form a retroreflective film;

The protective layer surface of the above retroreflective film was placed beneath a metal exposure template made of stainless steel material, so as to subject the retroreflective film to first exposure treatment via linear polarized ultraviolet light. The exposure time was 0.3 seconds, the exposure energy was 50 mJ/cm$^2$ and the exposure angle was 90°;

The exposure template graphics and the exposure angle were changed, then a second exposure treatment was carried out. The exposure time was 0.3 seconds, the exposure energy was 50 mJ/cm$^2$ and the exposure angle was 35°;

Finally, a reflective layer material Al was high-vacuum vapor-deposited on the photopolymerizable information layer to form an anti-counterfeiting film having visible graphics information which can change along with the visual angle.

The thickness of the protective layer 1 was 40 μm, the thickness of the binder layer 2 was 70 μm, the thickness of the photopolymerizable information layer 4 was 30 μm, the thickness of the reflective layer 5 was 120 nm and the spherical diameter of the retroreflective layer 3 was 60 μm.

The invention claimed is:

1. An anti-counterfeiting film, comprising a protective layer, a binder layer, a retroreflective layer, a photopolymerizable information layer and a reflective layer which are combined in turn; wherein the retroreflective layer is embedded spherically in the binder layer, and the photopolymerizable information layer has been recorded with graphics information which can change as the viewing angle changes.

2. The anti-counterfeiting film according to claim 1, wherein the spherical diameter of the retroreflective layer is from 10 μm to 100 μm, the thickness of the protective layer is from 25 μm to 50 μm, the thickness of the binder layer is from 50 μm to 70 μm, the thickness of the photopolymerizable information layer is from 15 μm to 30 μm and the thickness of the reflective layer is from 60 nm to 200 nm.

3. The anti-counterfeiting film according to claim 1, wherein the material of the protective layer is transparent macromolecular polyester;
the material of the binder layer is macromolecular resin;
the retroreflective layer is glass or polycarbonate;
the material of the photopolymerizable information layer comprises components having the following weight percentages:
photopolymerization monomer: 20%-60%
photoinitiator: 1%-10%
binder: 30%-79%
with the sum of the percentages of the above respective component being 100%;
the photopolymerization monomer is selected from the group consisting of 2-phenoxyethyl acrylate, ethoxylated 1,6-hexanediol diacrylate, polyethylene glycol diacrylate, alkyl polyglucoside and ethoxylated bisphenol A dimethacrylate;
the binder is selected from the group consisting of acrylic acid, methacrylic acid, methyl methacrylate and 2-ethylhexyl acrylate;
the photoinitiator is selected from the group consisting of benzophenone, diethylamino benzophenone, leuco crystal violet and toluenesulfonic acid monohydrate; and
the reflective layer is selected from the group consisting of aluminum, argentum and chromium.

4. The anti-counterfeiting film according to claim 1, wherein the material of the protective layer is polyethylene terephthalate, polycarbonate, polystyrene and polyvinyl chloride; and the binder layer is selected from the group consisting of polyurethane, phenolic resin and polyacrylic resin.

5. A process for preparation of the anti-counterfeiting film comprising the following steps:
coating a binder layer material over a protective layer;
embedding a retroreflective layer material into the binder layer and drying;
coating a photopolymerizable information layer material over the retroreflective layer and drying to obtain a retroreflective film;
placing the upper surface of the protective layer of the retroreflective film beneath an exposure template configured with template graphics;
subjecting the retroreflective film to first exposure treatment via linear polarized ultraviolet light; and
changing the exposure template graphics and exposure angle, subjecting the retroreflective film to second exposure treatment via linear polarized ultraviolet light, so as to form different graphics information at another angle, and then high-vacuum vapor-depositing a reflective layer material on the photopolymerizable information layer to obtain the anti-counterfeiting film.

6. The process according to claim 5, wherein the exposure time is 0.1-0.9 seconds, the exposure energy is 30-50 mJ/cm$^2$ and the exposure angle is 60°-90° in the first exposure treatment; and the exposure time is 0.1-0.9 seconds, the exposure energy is 30-50 mJ/cm$^2$ and the exposure angle is 15°-60° in the second exposure treatment.

7. The process according to claim 6, wherein the angle difference between the first exposure treatment and the second exposure treatment is from 30° to 50°.

8. The process according to claim 5, wherein the exposure template is selected from the group consisting of lighttight polyester material, metal material and lighttight glass or transmissive display, electrically controlled birefringence liquid crystal display, phase change liquid crystal display, super twisted nematic liquid crystal display and low-temperature polycrystalline silicon liquid crystal display.

* * * * *

UNITED STATES PATENT AND TRADEMARK OFFICE
CERTIFICATE OF CORRECTION

Page 1 of 1

PATENT NO.           : 8,444,279 B2
APPLICATION NO.      : 13/001979
DATED                : May 21, 2013
INVENTOR(S)          : Liangheng Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 369 days.

Signed and Sealed this
Sixteenth Day of December, 2014

Michelle K. Lee
*Deputy Director of the United States Patent and Trademark Office*